United States Patent [19]

Kaufman

[11] 4,064,026
[45] Dec. 20, 1977

[54] POLYEPOXIDE ETHER POLYACRYLATE MIXTURES

[75] Inventor: Marvin L. Kaufman, Bridgewater, N.J.

[73] Assignee: Mobil Oil Corporation, New York, N.Y.

[21] Appl. No.: 676,016

[22] Filed: Apr. 12, 1976

[51] Int. Cl.$^2$ .................. C08G 18/04; C08L 63/10
[52] U.S. Cl. ..................... 204/159.19; 204/159.15; 260/836; 260/837 R
[58] Field of Search .............. 260/837 R, 836; 204/159.19

[56] References Cited

U.S. PATENT DOCUMENTS

| | | | |
|---|---|---|---|
| 3,770,602 | 11/1973 | D'Alelio | 204/159.15 |
| 3,773,856 | 11/1973 | Takiyama et al. | 260/836 |
| 3,840,448 | 10/1974 | Osborn et al. | 204/159.14 |
| 3,915,824 | 10/1975 | McGinniss | 204/159.23 |

Primary Examiner—Murray Tillman
Assistant Examiner—Thurman K. Page
Attorney, Agent, or Firm—Charles A. Huggett

[57] ABSTRACT

Liquid mixtures which are curable by exposure to ultraviolet light when appropriately photosensitized are provided by etherifying a polyepoxide with an at least 25% stoichiometric excess of an hydroxy alkyl ester of an alpha, beta-monoethylenically unsaturated monocarboxylic acid, expecially hydroxy ethyl acrylate. The unreacted hydroxy alkyl ester is then consumed by reaction with at least 1 molar equivalent of a monoanhydride, such as a monoepoxide, a lactone, or a monoisocyante.

16 Claims, No Drawings

POLYEPOXIDE ETHER POLYACRYLATE MIXTURES

The present invention relates to polyepoxide ether polyacrylates in the form of liquid mixtures, the production thereof, and includes ultraviolet curing systems containing the same.

In accordance with this invention, a polyepoxide is reacted with a stoichiometric excess of hydroxy alkyl acrylate in the presence of a Lewis acid catalyst to form a mixture of polyepoxide polyacrylate ether and unreacted hydroxy alkyl acrylate. This insures the absence of epoxy functionality in a resinous structure, but the unreacted acrylate monomer is volatile and undesirable. A monoepoxide or other monoanhydride is then added in an amount of at least about 1 mole per mole of unreacted hydroxy alkyl acrylate, and a second reaction is carried out in the presence of a Lewis acid catalyst. The result is a mixture of polyepoxide ether polyacrylates and monoacrylate derivatives with the monoahydride, and this mixture, either per se, or in combination with materials, especially other mono- or polyethylenically unsaturated compounds, exhibits a highly useful ultraviolet cure in the presence of a photosensitizer rendering the compostion sensitive to ultraviolet light. Hydroxy ethyl acrylate providing a primary hydroxy group is particularly preferred.

The unreacted hyroxy alkyl acrylate-monoanhydride derivative provides increased fluidity, and the volatile and obnoxious unreacted acrylate is removed from the system.

The polyepoxide is subject to wide variation so long as it has an epoxy functionality of at least 1.2. The preferred polyepoxides are relatively low molecular weight diglycidyl ethers of a bisphenol having an epoxy functionality of 1.4 to 2.0, and these particularly illustrated by diglycidyl ethers of bisphenol A having a molecular weight in the range of 350 – 4000, most desirably 350 –600. The commercial epoxy resin Epon 828 (Shell) which is a diglycidyl ether of bisphenol A having an epoxide equivalent weight of about 190 and an average molecular weight of about 380 will be used as illustrative in Examples 1 and 2 hereinafter.

While the aromatic diepoxides are preferred, the aliphatic polyepoxides and polyepoxides having higher epoxy functionality are also useful, including expoxidized soya oil, epoxy novolaks, 1,4-butanediol diglycidyl ether and the like. These are all well known and availabel in commerce.

The preferred polyepoxides contain the epoxy group, the secondary hydroxy group, and no other reactive groups. Etherification increases the hydroxy functionality, or provides it when there is none in the starting polyepoxide.

Reference has been made to the use of hydroxy alkyl acrylates since these are particularly contemplated, but other hydroxy alkyl esters of alpha, beta-monoethylenically unsaturated monocarboxylic acids, such as methacrylic acid, may be used instead. This provides polyethylenic polyepoxide polyethers instead of polyepoxide ether polyacrylates. The acrylate esters exhibit the best ultraviolet cure and are outstanding in this invention. Acrylate unsaturation also performs well in electron beam curing and, while the invention is especially applicable to ultraviolet curing, all sorts of radiation cures and conventional free radical cures are contemplated. The alkyl group of the unsaturated esters preferably contains from 2–4 carbon atoms, and it is particularly desirable to employ a primary hydroxy group as is present in hydroxy ethyl acrylate.

The etherification reaction is carried out in the presence of a Lewis acid catalyst, such as $BF_3$ etherate or stannic chloride, and at a typical temperature of about 30–70° C. In the presence of inhibitors, higher temperatures up to about 120° C. may be used, but practical operation suggests an upper limit of about 80° C. Very low temperatures are also useful, but the reaction slows with decreasing temperature.

It is important to maximize the acrylate functionality, and especially in the presence of amine cosensitizers to substantially completely eliminate the epoxy groups in the resinous starting material since this leads to storage instability. In order to insure the elimination of epoxy functionality, it is desired to employ an at least 25% stoichiometric excess (based on the epoxy group) of hydroxy alkyl acrylate, and this means that considerable hydroxy alkyl acrylate will remain after all of the epoxy groups have been consumed. At this point, there is added at least 1 and preferably 2 moles of a monoanhydride for each hydroxy group in the hydroxy alkyl acrylate.

It is recognized that there are hydroxy groups present on the etherified polyepoxide, but these are secondary hydroxy groups which are not as reactive as are the hydroxy groups on the hydroxy alkyl acrylate. This is particularly true using the preferred ethyl acrylate which contains primary hydroxy groups. It is desired especially to minimize cross-linking during the reaction with polyepoxide, and this is achieved by selecting polyepoxides of minimum hydroxyl value and by using a primary hydroxy group in the acrylate, and most preferably by using both expedients.

The anhydride which is utilized may be either a monoepoxide, a lactone, or a monoisocyanate. Mixtures are also contemplated. The reaction is again preferential with the hydroxy groups of the hydroxy alkyl acrylate, expecially when hydroxy ethyl acrylate is used, but the reaction with the monoanhydride does not tend to produce a gel. While anhydrides are referred to, and a monoisocyanate can be aptly termed an anhydride of a carbamic acid, the monoisocyanate would not normally be formed by dehydration.

It is preferred to react at least about 1.5 moles, preferably at least 3 moles, of the monoanhydride with the unreacted hydroxy alkyl acrylate derivative, since this maximizes water resistance and ultraviolet sensitivity, and it significantly reduces volatility and toxicity by totally eliminating the unreacted hydroxy alkyl acrylate. The polyethers provide the best ultraviolet sensitivity, and are preferred.

There is normally little purpose served by using more than 10 moles of the monoanhydride on the basis noted above.

Various monoepoxides may be used herein, such as propylene oxide, butylene oxide, butyl glycidyl ether, phenyl glycidyl ether, cyclohexene oxide, and the like. The oxirane group is preferably carried by an aliphatic group. While other functionality which is inert under the conditions of reaction may be present, such as the halogen group as in epichlorohydrin, it is usually preferred that a single 1,2- epoxide group be the sole functional group present. Propylene oxide is the preferred monoepoxide. While the 1,2-epoxide group is preferred, this is not essential and tetrahydrofuran and 1,3-dioxolane are fully useful to illustrate this. In some instances, and to provide polyacrylates directly, glycidyl acrylate may be used, particularly together with a conventional monoepoxide such as propylene oxide. While ethylene oxide produces undesired water solubility when used alone, it is possible to have some of it present herein where other agents overcome or minimize the problem of water sensitivity.

Various lactones may be used, such as butyrolactone or caprolactone. Epsilon caprolactone is the preferred lactone.

Useful monoisocyanates are illustrated by butyl monoisocyanate.

In the ultraviolet curable systems which are contemplated, it is desired that these include a photosensitizer rendering the composition sensitive to ultraviolet light. Since the ultraviolet radiation causes a substantially instantaneous conversion from the liquid to the solid state, volatile solvents are largely absent and normally any volatile organic solvent would be present in a maximum of 10% by weight of the composition.

Typical photosensitizers are illustrated by benzophenone and by benzoin ethers such as the methyl or butyl ether, but these are merely illustrative and numerous photosensitizers are well known to the art.

It is common to employ amine cosensitizers and these may be present but they tend to create yellowing and other problems and it is a feature of this invention that amine cosensitizers are not needed.

It is permissible to increase the functionality of the systems utilized herein by prereacting them with a small proportion, up to about 5% of the weight of the mixture, of an organic compound containing a plurality of reactive groups which will adduct with the active hydrogen in the compositions of this invention in order to increase the molecular weight. Organic polyisocyanates, illustrated by toluene diisocyanate may be used. Another agent which may be used for this purpose is benzophenone-tetracarboxylic acid dianhydride.

The purpose is to have an addition reaction in order to increase molecular weihht and this can be carried out at moderate temperatures which do not activate the ethylenic unsaturation.

The products herein are mixtures which are liquid at room temperature so any increase in molecular weight is limited by retention of sufficient fluidity to permit coating application. Similarly, if the molecular weight of the monoepoxide increases, the diacrylate ether formed therefrom tends to be less liquid, and more of the hydroxy alkyl acrylate polyether is required in order to liquify the system. As will be evident, this invention is directed to liquid mixtures, particularly those which contain less than 10% by weight of volatile organic solvent in order to provide a liquid of coating viscosity.

The ultraviolet curing systems of this invention may also contain other ethylenically unsaturated materials which are illustrated by styrene, acrylonitrile, butylene glycol diacrylate, trimethylol propane triacrylate, pentaerythritol triacrylate, epoxy polyacrylates (both di- and tetraacrylates) and maleic polyesters.

The invention is illustrated in the examples which follow.

EXAMPLE 1

Charge a dry reaction vessel fitted with a stirrer, thermometer, condenser, nitrogen inlet and outlet and two addition funnels with 1240 grams hydroxyethyl acrylate (10.69 moles). Heat to 50° C. and add 1 ml. boron trifluoride etherate ($BF_3.OET_2$) and then add continuously 700 grams Epon 828 (4.0 eq. epoxide). Maintain the temperature at 50° C. with cooling. When the reaction is complete, add continuously with cooling and with additional boron trifluoride etherate, as required, 1940 grams propylene oxide (33.45 moles). When the reaction is complete, add triethyl amine to decolorize and neutralize excess catalyst and add 0.388 gram hydroquinone. The product is a pale yellow liquid of 250 –300 cps. viscosity. It is a mixture of a difunctional acrylate and a monofunctional monomer.

The inclusion in the foregoing of 2% by weight of benzophenone (the mixture is heated until the benzophenone dissolves) provides a coating composition which cures rapidly and with high conversion on exposure to ultraviolet light. The cure is nonair-inhibited and takes place regardless of whether the system is sensitized with amine sensitizers (such as 1% by weight of dimethyl ethanol amine) or not.

EXAMPLE 2

Charge a dry reaction vessel fitted with a stirrer, thermometer, condenser, nitrogen inlet and outlet and two addition funnels with 488g hydroxyethyl acrylate. Heat to 50° C. and add 1 ml. boron trifluoride etherate and then add 180g Epon 828 while maintaining the temperature at 50° C. by suitable cooling. When the addition is complete add about 1 ml. of triethyl amine. Heat to 70° C. and add 0.2g dibutyl tin dilaurate catalyst followed by the addition of 318g butyl isocyanate. Continue heating until the butyl isocyanate is completely reacted. The product is a low viscosity liquid (140–180 cps). It is a mixture of a difunctional acrylate derivative of the starting polyepoxide and a monofunctional acrylate monomer which increases fluidity and is relatively nonvolatile. This product cures in the same way as the product of Example 1.

I claim:

1. A liquid mixture comprising polyethylenic polyepoxide polyether produced by etherifying a polyepoxide having an epoxy functionality of at least 1.2 and a molecular weight in the range of 350–4000, with an at least 25% stoichiometric excess, based on the epoxy group, of an hydroxy alkyl ester of an alpha, beta-monoethyenically unsaturated monocarboxylic acid, and then reacting the unreacted hydroxy alkyl ester with at least one molar equivalent of a monoanhydride selected from monoexpoides, lactones, monoisocyanates, and mixtures thereof, to substantially consume said unreacted hydroxy alkyl ester.

2. A mixture as recited in claim 1 in which said polyepoxide is a diglycidyl ether having a molecular weight in the range of 350–600 and said monoanhydride is used in an amount of at least 1.5 moles per mole of unreacted hydroxy alkyl ester.

3. A mixture as recited in claim 1 in which said hydroxy alkyl ester carries a primary hydroxy group.

4. A liquid mixture containing less than 10% of volatile organic solvent and comprising polyepoxide ether polyacrylate produced by etherifying a polyepoxide having an epoxy functionality of at least 1.4 and a molecular weight in the range of 350–4000, with an at least 25% stoichiometric excess based on the epoxy group of an hydroxy alkyl acrylate to consume said epoxy functionality, and then reacting the unreacted hydroxyl alkyl acrylate with at least one molar equivalent of a monoanhydride selected from monoepoxides, lactones, monoisocyanates, and mixtures thereof to substantially consume said unreacted hydroxy alkyl acrylate.

5. A liquid mixture as recited in claim 4 in which said hydroxy alkyl acrylate is hydroxy ethyl acrylate.

6. A liquid mixture as recited in claim 5 in which said polyepoxide is a diglycidyl ether of a bisphenol having a molecular weight in the range of 350–600 and an epoxy functionally in the range of 1.4–2.0.

7. A liquid mixture as recited in claim 5 in which at least 3 moles of monoepoxide or lactone are used per mole of unreacted hydroxy ethyl acrylate.

8. A liquid mixture as recited in claim 5 in which said monoanhydride is a monoepoxide.

9. A liquid mixture as recited in claim 8 in which said monoepoxide comprises propylene oxide.

10. A liquid mixture as recited in claim 5 in which the etherification reaction is carried out in the presence of a Lewis acid catalyst.

11. A liquid mixture as recited in claim 10 in which the catalyst is boron trifluoride etherate.

12. A liquid mixture as recited in claim 5 in which the functionality of the mixture is increased by prereaction with up to about 5% of the weight of the mixture of an organic compound containing a plurality of groups which will adduct with reactive hydrogen.

13. A liquid mixture as recited in claim 1 in which said polyepoxide is an aliphatic polyepoxide.

14. An ultraviolet-curable liquid mixture comprising the liquid mixture of claim 4 and photosensitizer rendering the composition sensitive to ultraviolet light.

15. A liquid mixture as recited in claim 5 in which said monoanhydride is a monoisocyanate.

16. A liquid mixture as recited in claim 15 in which said monoisocyanate is butylisocyanate.

* * * * *